United States Patent
Singh et al.

(10) Patent No.: US 10,732,948 B2
(45) Date of Patent: Aug. 4, 2020

(54) SYSTEM AND METHOD FOR IMPLEMENTING AUTOMATED DEPLOYMENT

(71) Applicant: JPMorgan Chase Bank, N.A., New York, NY (US)

(72) Inventors: Jagmohan Singh, Coppell, TX (US); Ravikanth H. Cuttambakam, Flower Mound, TX (US); Prasad V. Pondicherry, Plano, TX (US); Jagdish G. Bankar, McKinney, TX (US); Krishna Char, Dublin, OH (US); John Henry Hom, Lewisville, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 16/207,531

(22) Filed: Dec. 3, 2018

(65) Prior Publication Data

US 2019/0171427 A1  Jun. 6, 2019

Related U.S. Application Data

(60) Provisional application No. 62/593,328, filed on Dec. 1, 2017.

(51) Int. Cl.
| | |
|---|---|
| G06F 9/445 | (2018.01) |
| G06F 8/60 | (2018.01) |
| G06F 16/25 | (2019.01) |
| G06F 8/71 | (2018.01) |
| G06F 8/77 | (2018.01) |

(52) U.S. Cl.
CPC .............. G06F 8/60 (2013.01); G06F 8/71 (2013.01); G06F 8/77 (2013.01); G06F 16/254 (2019.01)

(58) Field of Classification Search
CPC .................................................. G06F 8/60–77
USPC ......................................................... 717/177
See application file for complete search history.

(56) References Cited

U.S. PATENT DOCUMENTS

| | | | | |
|---|---|---|---|---|
| 7,350,191 | B1 * | 3/2008 | Kompella | G06F 9/44526 717/108 |
| 7,421,458 | B1 * | 9/2008 | Taylor | G06F 16/289 |
| 7,437,614 | B2 * | 10/2008 | Haswell | G06F 11/3684 714/38.13 |
| 7,613,704 | B2 * | 11/2009 | Lobo | G06F 16/10 |
| 7,694,272 | B2 * | 4/2010 | Bronicki | G06F 8/34 717/104 |

(Continued)

OTHER PUBLICATIONS

Tony Savor et al.; "Continuous Deployment at Facebook and Oanda"—2016 IEEE/ACM 38th IEEE International Conference on Software Engineering Companion.*

*Primary Examiner* — Francisco J Aponte
(74) *Attorney, Agent, or Firm* — Hunth Andrews Kurth LLP (57) ABSTRACT

An embodiment of the present invention is directed to automating deployment into tools and technologies related to big data analytics. The innovative system automates deployment and integration of various data related tools and technologies while managing internal applications and processes for change management. Deployment generally refers to implementation of code into the production environment. The innovative system integrates with an entity's Change Management Tools and Processes (e.g., ITSM, AIM, GFS, etc.) to provide automated deployment.

14 Claims, 6 Drawing Sheets

(56) References Cited

U.S. PATENT DOCUMENTS

| | | | | |
|---|---|---|---|---|
| 7,937,685 B2* | 5/2011 | Weil | G06F 8/71 | 717/103 |
| 8,151,365 B2* | 4/2012 | Chen | G06F 21/6209 | 717/110 |
| 8,219,649 B2* | 7/2012 | Ball | G06F 9/453 | 709/220 |
| 8,255,871 B1* | 8/2012 | Kompella | G06F 9/44526 | 717/108 |
| 8,434,060 B2* | 4/2013 | Driesen | G06F 8/60 | 434/118 |
| 8,452,742 B2* | 5/2013 | Hashimoto | G06F 8/71 | 707/695 |
| 8,584,112 B2* | 11/2013 | Young | G06F 8/70 | 717/162 |
| 8,615,737 B2* | 12/2013 | Walsh | G06F 21/53 | 717/120 |
| 8,819,617 B1* | 8/2014 | Koenig | G06F 8/70 | 717/101 |
| 8,862,545 B2* | 10/2014 | Demiroski | G06Q 10/06 | 707/635 |
| 8,904,341 B2* | 12/2014 | Edwards | G06Q 10/04 | 717/104 |
| 8,943,493 B2* | 1/2015 | Schneider | G06F 8/65 | 717/120 |
| 9,063,808 B2* | 6/2015 | Makonahalli | G06F 8/60 | |
| 9,201,647 B2* | 12/2015 | El-Assir | G06F 8/61 | |
| 9,319,430 B2* | 4/2016 | Bell, Jr. | H04L 63/20 | |
| 9,454,351 B2* | 9/2016 | Anderson | G06F 8/60 | |
| 9,519,695 B2* | 12/2016 | Sampathkumaran | G06F 16/254 | |
| 9,703,680 B1* | 7/2017 | Chang | G06F 8/60 | |
| 9,928,059 B1* | 3/2018 | Sartor | G06F 8/71 | |
| 10,095,220 B1* | 10/2018 | Addo | G05B 19/4155 | |
| 10,176,238 B2* | 1/2019 | Kothari | G06F 16/2365 | |
| 10,318,412 B1* | 6/2019 | McKearney, Jr. | G06F 8/30 | |
| 10,437,583 B2* | 10/2019 | Spofford | G06Q 10/0637 | |
| 2003/0182652 A1* | 9/2003 | Custodio | G06F 8/61 | 717/122 |
| 2005/0033588 A1* | 2/2005 | Ruiz | G06Q 10/06 | 705/35 |
| 2005/0044531 A1* | 2/2005 | Chawla | G06F 8/71 | 717/122 |
| 2011/0107299 A1* | 5/2011 | Dehaan | G06F 9/45533 | 717/121 |
| 2011/0154314 A1* | 6/2011 | Balasubramanian | G06F 8/65 | 717/171 |
| 2011/0320399 A1* | 12/2011 | Ledwich | G06Q 10/06 | 707/602 |
| 2012/0110030 A1* | 5/2012 | Pomponio | G06F 8/36 | 707/805 |
| 2012/0180024 A1* | 7/2012 | Gonzalez | G06F 8/71 | 717/109 |
| 2012/0246170 A1* | 9/2012 | Iantorno | G06F 11/3672 | 707/748 |
| 2012/0265726 A1* | 10/2012 | Padmanabhan | G06F 16/214 | 707/602 |
| 2013/0067017 A1* | 3/2013 | Carriere | G06Q 10/06 | 709/208 |
| 2014/0115557 A1* | 4/2014 | Holler | G06F 9/44 | 717/102 |
| 2014/0180961 A1* | 6/2014 | Hankins | G06Q 10/10 | 705/348 |
| 2014/0304229 A1* | 10/2014 | Zhu | G06F 16/27 | 707/634 |
| 2015/0067643 A1* | 3/2015 | Behnia | G06F 8/71 | 717/121 |
| 2015/0128112 A1* | 5/2015 | Choi | G06F 8/71 | 717/140 |
| 2016/0078041 A1* | 3/2016 | Hartig | G06F 9/44521 | 707/696 |
| 2016/0092525 A1* | 3/2016 | Kothari | G06F 16/219 | 707/602 |
| 2016/0092538 A1* | 3/2016 | Verma | G06F 16/21 | 707/639 |
| 2016/0127454 A1* | 5/2016 | Maheshwari | H04L 67/1097 | 709/223 |
| 2016/0321339 A1* | 11/2016 | Tekade | G06F 8/76 | |
| 2017/0006135 A1* | 1/2017 | Siebel | G06F 9/5072 | |
| 2017/0228231 A1* | 8/2017 | Pangam | G06F 21/629 | |
| 2017/0286471 A1* | 10/2017 | Upadhyaya | G06F 16/2379 | |
| 2017/0351511 A1* | 12/2017 | Bar-Or | G06F 8/34 | |
| 2018/0039494 A1* | 2/2018 | Lander | C08J 3/005 | |
| 2018/0096043 A1* | 4/2018 | Ledbetter | G06F 16/213 | |
| 2018/0121182 A1* | 5/2018 | Owen | G06F 8/71 | |
| 2018/0293263 A1* | 10/2018 | Fontaine | G06F 16/2291 | |
| 2019/0129991 A1* | 5/2019 | Auer | G06F 21/6218 | |
| 2019/0130010 A1* | 5/2019 | Auer | G06F 16/2365 | |
| 2019/0146949 A1* | 5/2019 | Kothari | G06F 16/13 | 707/602 |

* cited by examiner

Home  Change Level Report  Task Level Report  Task Status report  Live  Alerts  Template Validation Step 1. Choose Technology*  610
Choose Technology Step 2. Create Task to ITSM  612

Step 3. Generate Template for ITSM  614
Type ITSM #   Choose Task Number
Action  Target Environment  Target server  Repository         SVN/GFS URL    Email
        Choose Target Env  Choose Server  Choose Repository
Add Row  View Template Step 4. Upload Template to ITSM  616
Task Number*:       Initiator / Owner SID*:
Enter Task#         Enter SID
Upload Template Step 5. Validate ITSM  618
ITSM Number*:   Email*:
Enter ITSM#     Enter Email
Validate ITSM

Figure 6

SYSTEM AND METHOD FOR IMPLEMENTING AUTOMATED DEPLOYMENT

CROSS REFERENCE TO RELATED APPLICATIONS

The application claims priority to U.S. Provisional Application 62/593,328, filed Dec. 1, 2017, the contents of which are incorporated herein in its entirety.

FIELD OF THE INVENTION

The invention relates generally to a system and method for automated deployment and integration of various data related tools and technologies while managing internal applications and processes for change management.

BACKGROUND OF THE INVENTION

Production deployment of various data related tools and technologies has traditionally involved a complex manual process as deployment relates to relational database management systems, including Database Data Definition Language (DDLs) (scripts for making data structure changes) and Data Manipulation Language (DMLs) (scripts for aking data changes); Teradata database DDLs (scripts for making data structure changes) and DMLs (scripts for making data changes); Informatica ETL code; abinitio ETL code; and job scheduling and workload automation software code (e.g., BMC Control-M scheduler code). ETL represents extract, transform, load which are three database functions that are combined into a tool to pull data out of a database and place it into another database.

Software deployment generally refers to making a software system available for use. This may involve preparing a software application to run and operate in a specific environment. The deployment process may include installation, configuration, testing and making changes to optimize performance of the software. Current systems require a manual deployment process is very slow, expensive, and error prone.

These and other drawbacks exist.

SUMMARY OF THE INVENTION

According to one embodiment, the invention relates to a system that integrates an automated deployment system with a change management tool and process. The system comprises: an input that receives an instruction signal; a memory component; and a computer server coupled to the input and the memory component, the computer server comprising a programmed computer processor configured to: identify, at a change management tool, a software build for deployment from an application development (AD) team; create, at the change management tool, a software versioning and revision control system link and submit implementation plan for deployment; retrieve a password from an Enterprise Password Vault (EPV); identify one or more deployment parameters based on the implementation plan; execute, via the automated deployment system, a deployment script based on the one or more deployment parameters; transmit, via an electronic communication, log files of the deployment script to the AD team; and validate the electronic communication and the log files.

According to another embodiment, the invention relates to a method that integrates an automated deployment system with a change management tool and process. The method comprises the steps of: identifying, at a change management tool, a software build for deployment from an application development (AD) team; creating, at the change management tool, a software versioning and revision control system link and submit implementation plan for deployment; retrieving a password from an Enterprise Password Vault (EPV); identifying one or more deployment parameters based on the implementation plan; executing, via the automated deployment system, a deployment script based on the one or more deployment parameters; transmitting, via an electronic communication, log files of the deployment script to the AD team; and validating the electronic communication and the log files.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. The features of an embodiment of the present invention may provide numerous benefits to deployment teams, application developers and other users. For example, the innovative system simplifies labor intensive and complicated manual processes into a streamlined automated plan. This saves hours and hours of documentation and review for large deployments and minimizes errors and mistakes. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to automating deployment into tools and technologies related to big data analytics. Software deployment generally refers to implementation of code into the production environment. Currently, software deployment is a manual and time-consuming process. The innovative system integrates with an entity's Change Management tools and processes, e.g., ITSM, AIM, GFS, etc. to provide automated deployment. IT Service Management (ITSM) represents change management that ensures standardized methods, processes and procedures are used for changes and further facilitates efficient and prompt handling of changes while maintaining a balance between a need for change and potential detrimental impact of changes. An objective of change management may relate to ensuring that standardized methods and procedures are used for efficient and prompt handling of changes to control IT infrastructure to minimize impact of any related incidents.

Application Infrastructure Model (AIM) represents a process for deploying, configuring, executing, and/or monitoring software through a consistent user interface. AIM implements a declarative, data-driven model that provides visibility into what is deployed and running. It offers cross-platform support, built-in risk controls, integration with enterprise platforms, and increased productivity. Deployment reliability, predictability, and resiliency are some of the benefits of this process. AIM further provides end-to-end automation and orchestration of change events. It adds workflow automation capability, expands platform support, leverages built-in controls, and creates a migration path for users.

Global File System (GFS) represents an application software artifact storage and distribution system. GFS provides guaranteed immutability where files are moved from a secure, read-only repository ("write once, read many" semantics) to each environment, with a guarantee that the content has not changed. GFS also provides globally consistent namespace where applications published into the AIM store are organized according to a defined folder/directory format, thereby presenting the same structure to endpoints regardless of the region or operating system. File transfers and placement onto endpoints may be performed quickly and efficiently, leveraging techniques such as de-duplication and cache servers in each region.

An embodiment of the present invention automates integration of deployment tools and change management. Once code has been developed, tested and certified by a team, an implementation plan may be defined. The implementation plan provides a detailed set of step-by-step instructions that explain and detail how deployment of the code will occur. For example, steps of an implementation plan may specify instructions such as extracting code from a specific repository (e.g., GFS repository); executing a Data Definition Language (DDL) script using a specific identifier (ID), etc. DDL represents a computer programming language for defining data structures, e.g., data schemas. DDL may use a declarative syntax to define columns and data types. The implementation plan may also specify steps involving generation of passwords to implement a database change, etc. For various scenarios and applications, the implementation plan may include hundreds and hundreds of steps.

An embodiment of the present invention is directed to eliminating or reducing errors in a deployment with hundreds of scripts. Typically, a 100 step deployment with 500 scripts would result in 20 plus errors on average. An embodiment of the present invention is further directed to reducing deployment time and improve efficiencies. For example, a 100 step deployment that would have taken hours for the manual deployment team can now be completed in a fraction of the time. Accordingly, validation time by the developers for a 100 step deployment may now be substantially reduced or even eliminated. Due to the amount of resources and time required with traditional approaches, deployments were generally limited to once a month or so. Instead of one large deployment every month, entities may now execute multiple deployments in a much shorter time period in accordance with the embodiments of the present invention. In addition, deployments may occur same day or instantaneously. For example, an embodiment of the present invention may support a continuous integration and deployment model. In this scenario, a team may make a software change (e.g., add a new feature) and deploy the change in production where end users may interact with the new feature immediately. This provides flexibility in meeting business and other needs.

An implementation plan of an embodiment of the present invention is directed to simplifying and streamlining the automation process. For example, with an embodiment of the present invention, 100 steps in the manual plan may now be reduced to about five steps with an automated deployment plan. In this example, an embodiment of the present invention may save days of documentation and review effort for each large deployment and further reduce errors and mistakes. Other efficiencies and benefits may be realized by the various features of an embodiment of the present invention.

The innovative system further provides automation of deployment for various vendor tools and integration of the automation with a firm's change management infrastructure. Accordingly, any automated deployment for these tools and technologies may use various embodiments of the solution.

Figure 1:
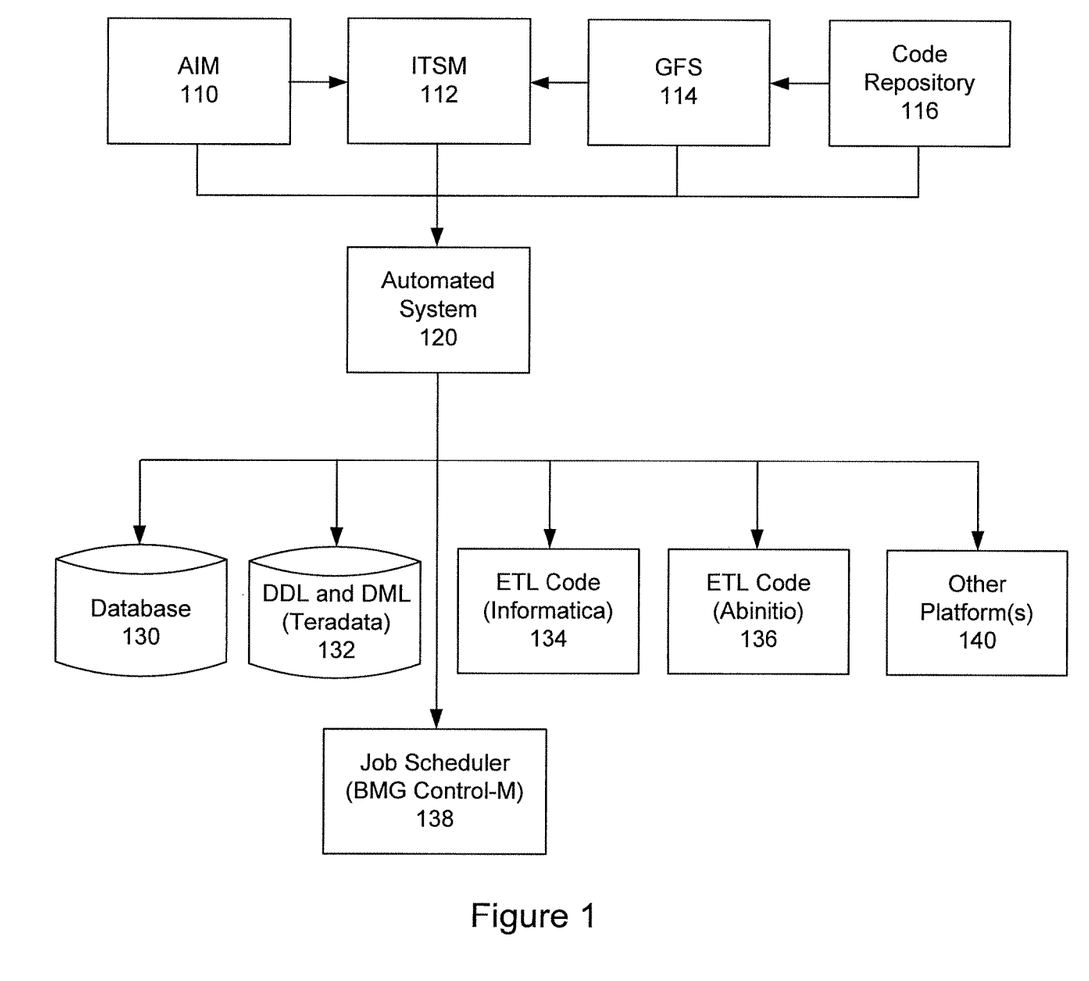
FIG. 1 is an exemplary system diagram of automated deployment, according to an embodiment of the present invention.

FIG. 1 is an exemplary system diagram of automated deployment, according to an embodiment of the present invention. As shown in FIG. 1, a firm's Change Management Tools and Processes may be represented by AIM 110, ITSM 112 and GFS 114. For example, once the code has been developed, tested and certified by an deployment team, an implementation plan may be defined. The implementation plan may represent a plan that provides a step-by-step sequence that explains how the deployment will occur. For example, steps may include: retrieving code out of a repository, e.g., GFS repository; retrieving code out of a specific directory and placing the code in a production directory on a particular file system in a specific location. Another type of deployment may include making a database structural change so that the implementation plan may include steps such as: extract Data Definition Language (DDL) script from a GFS repository 114 and execute the DDL script using a specific identifier with proper permissions to execute a database structural change. For example, the implementation plan may include details concerning retrieving code from a specific file location in a code repository, executing the code on a specific schema, using a specific identifier and password combination, retrieving a one-time generated password from a process, e.g., AIM 110, and executing the password. Other sources of code, scripts and/or other data may be supported by 116. For example, an embodiment of the present invention may integrate with various source code repositories, including Bitbucket, Java-based repositories, etc. An embodiment of the present invention may also support software versioning and revision control systems, including Subversion (SVN), etc.

Once the implementation plan is complete, the implementation plan may be uploaded into a Change Management System, e.g., ITSM 112. Depending on the type of environment, a set of approvals may be required. For example, changes to an environment may impact various other applications, teams, etc. Accordingly, approvals may be requested from impacted applications and teams. The implementation plan may be executed, this may involve extracting code from the GFS repository 114 and executing the code on a specific database for deployment. As shown in FIG. 1, Automated System 120 may execute the code on one or more specific databases, represented by 130, 132, 134, 136 and 138. An embodiment of the present invention is directed to big data deployment. Other platforms and architectures may be supported, as represented by 140.

Figure 2:
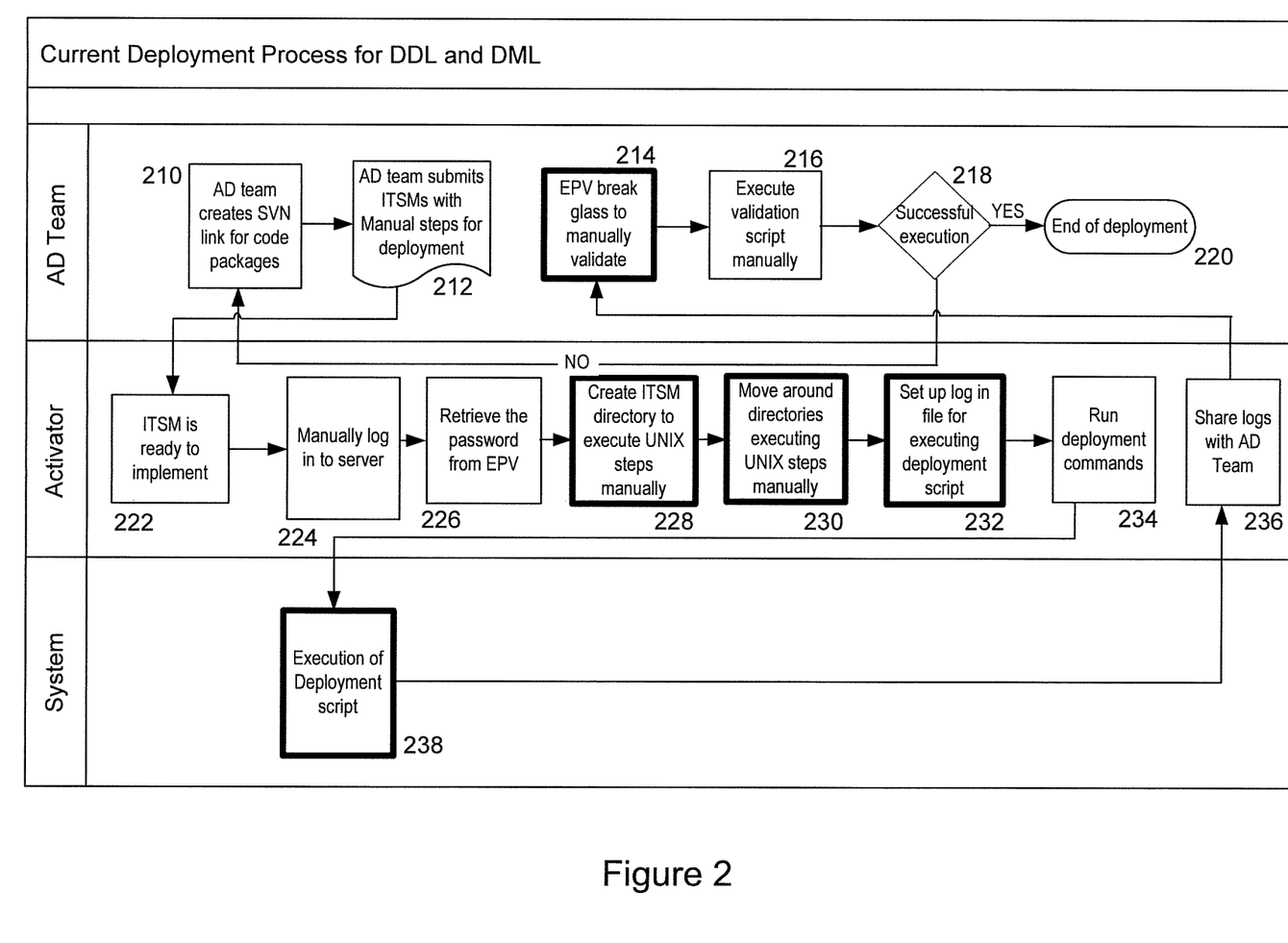
FIG. 2 is an exemplary flow diagram of a current process of deployment.

FIG. 2 is an exemplary flow diagram of a current process of deployment. FIG. 2 illustrates manual steps that are currently required. As shown, manual implementation plan steps require time and effort for implementation plan preparation. Reservation of activator and each activator may take hours for deployment by logging in to multiple server and running multiple UNIX commands. Here, a Developer may need to manually access EPV BG to validate the deployment and run separate commands for validations. Enterprise Password Vault-Break Glass (EPV-BG) represents a Privileged Access Management (PAM) application to secure, manage and control interactive access (also known as Break Glass event) to shared functional accounts with privileged access. It is a global application designed to secure, rotate and control access to privileged account passwords. EPV-BG may include several deployments, where each deployment may be tailored to meet specific regulatory, security and operational requirements. In addition, manual controls may be required while performing the deployments. Break glass refers to a quick means for a person who does not have access privileges to certain information o gain access when necessary.

Figure 3:
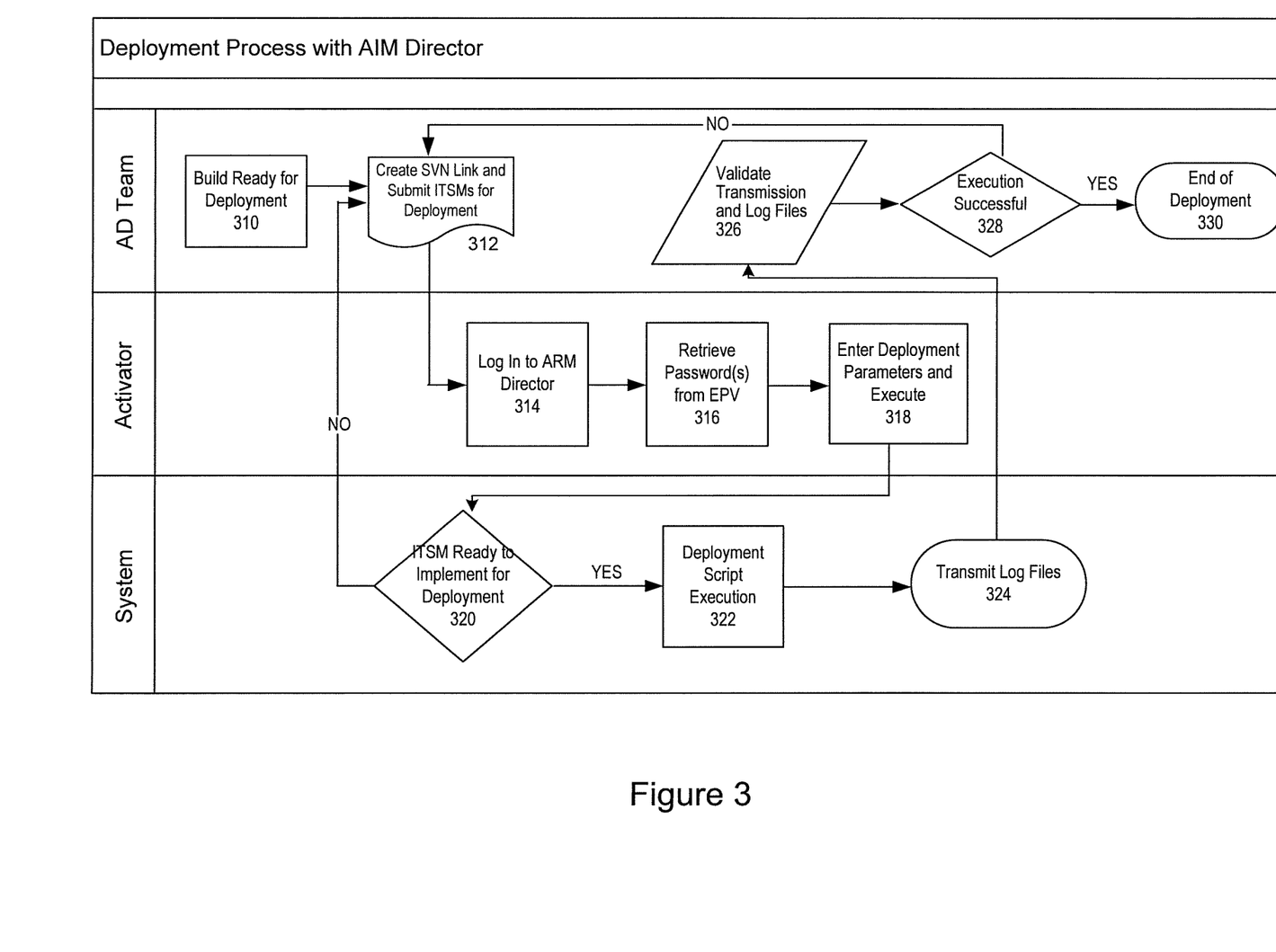
FIG. 3 is an exemplary flow diagram of automated deployment, according to an embodiment of the present invention.

As shown in FIG. 2, AD team may create a SVN link for code packages at step 210. At step 212, AD team may submit ITSMs with manual steps for deployment. At step 222, ITSM is ready to implement. At step 224, a manual log in to a server may occur. At step 226, password from EPV may be retrieved. At step 228, ITSM directory may be created to execute UNIX steps manually. At step 230, a ITSM deployment group resource may navigate to resource directories executing UNIX steps as per the manual steps listed in ITSM. At step 232, log in file may be set up for executing the deployment script. At step 234, the deployment commands may be run. At step 238, deployment script may be executed. At step 236, logs may be shared with the AD team. At step 214, a ITSM deployment group resource may login to Enterprise Password Vault (EPV) to perform a Break Glass (BG) operation and retrieve temporary password to manually validate the deployment. At step 216, validation script may be executed manually. At step 218, if execution is successful, then deployment may end at step 220. FIG. 2 highlights manual steps that may be removed by an embodiment of the present invention, as illustrated in FIG. 3. Namely, steps 214, 228, 230, 232 and 238 as well as various combinations of these steps may be eliminated.

FIG. 3 is an exemplary flow diagram of automated deployment, according to an embodiment of the present invention. According to an exemplary embodiment, manual implementation plan steps may be reduced to a software versioning and revision control system link, e.g., a SVN link, for code migration. SVN (Apache Subversion) represents a software versioning and revision control system that maintains current and historical versions of files such as source code, web pages, documentation, etc. According to an embodiment of the present invention, a manual login to server is not required thereby reducing deployment time. A validation communication, e.g., email, may be automated from a deployment script. Accordingly, an embodiment of the present invention does not require a developer to have access to an account to perform EPV BG. The system further includes automated system controls to migrate the code represented by SVN tags.

As shown in FIG. 3, Application Developer (AD) Team may indicate that a software build is ready for deployment at 310. AD Team may create a SVN link and submit ITSMs for deployment, at 312. SVN may represent a software versioning and revision control system. An Activator may log in to ARM Director, at 314. Activator may represent a ITSM deployment group resource. A password(s) may be retrieved from EPV, at 316. Activator may enter the deployment parameters, at step 318. This may be received via a in Job Options screen where the Job may be executed. The System may then determine whether ITSM is ready to implement for deployment, at 320. If yes, deployment script may be executed, at 322. A communication, e.g., email, may be sent to the AD team with log files, at 324. The AD team may validate the communication and log files, at 326. Accordingly, a EPV BG password is not required. AD Team may determine whether the execution was successful at 328. At 330, the deployment process may end.

The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
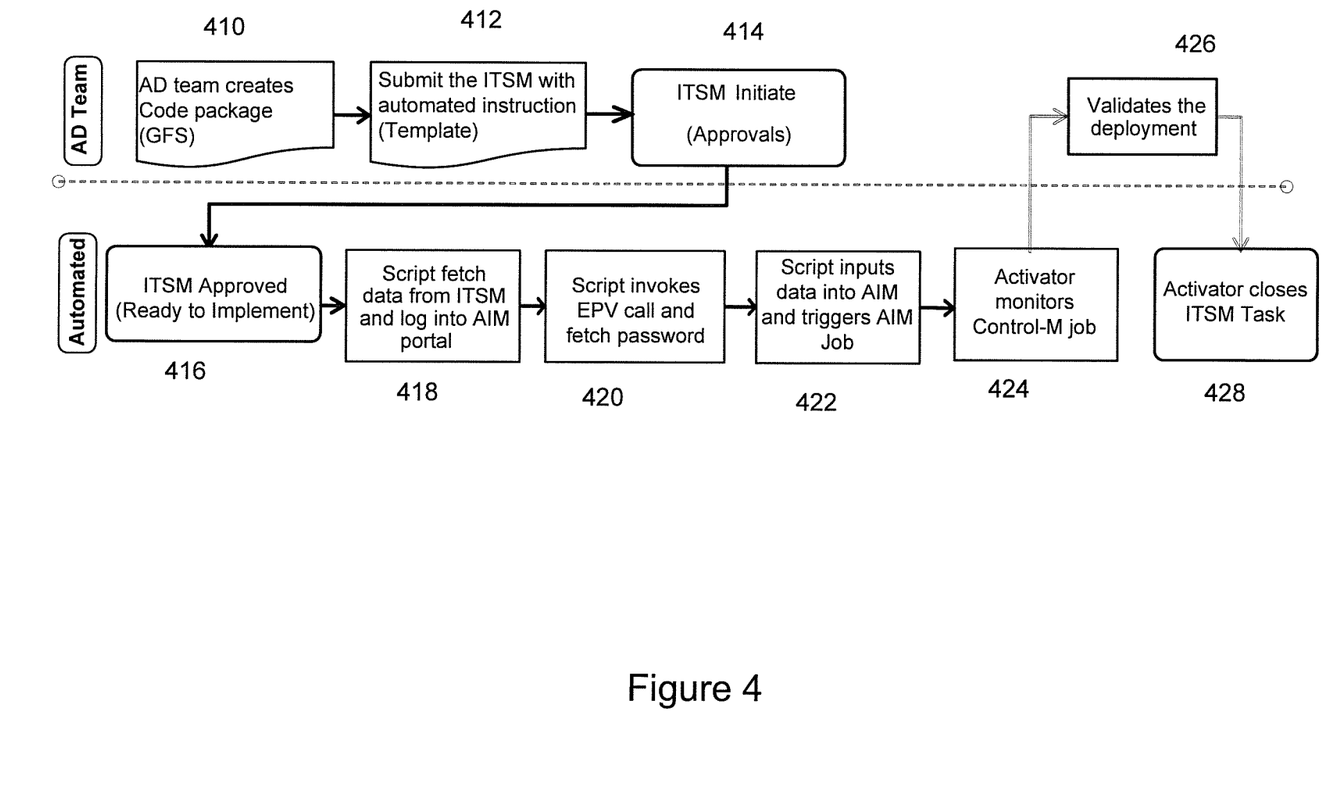
FIG. 4 is an exemplary flow diagram of continuous deployment, according to an embodiment of the present invention.

FIG. 4 is an exemplary flow diagram of continuous deployment, according to an embodiment of the present invention. An embodiment of the present invention is directed to a zero click deployment. As shown by FIG. 4, an AD team may create a code package at 410. This may be stored at a file system, such as Global File System. At step 412, the ITSM may be submitted with automated instructions. This may be submitted through a template, for example. At step 414, an approval process may be initiated, via a ITSM Initiate function. At 416, ITSM may be approved for implementation. At step 418, the process may script fetch data from ITSM and log into a portal, such as AIM portal. At step 420, the script may invoke a EPV call and fetch password(s) or other authentication data. At step 422, the process may script inputs data into AIM and trigger an AIM job. At step 424, an Activator may monitor, via a job scheduling and workload job, such as a Control-M job, for example. At step 426, the deployment may be validated. At step 428, the Activator may close the ITSM task. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

According to an exemplary application, a Control-M poller may run periodically, e.g., every 15 minutes, to poll the ITSMs that are in a ready to implement state. A script, such as a Python script, may parse ITSM tasks and schedule them as jobs in a job scheduling and workload automation tool (e.g., Control-M) on the fly. The jobs may trigger as per schedule, fetch details from template, and execute AIM director. Control-M is one example, other job scheduling and workload automation tools may be implemented. This exemplary application may also provide a Dashboard to monitor the process end to end in real time with alerts generated. An embodiment of the present invention transforms a manual deployment process (e.g., multiple deployment groups, individual commands, manual deployment, manual validation) to an automation of deployment (e.g., one deployment resource, automated script, script-based deployment, script based validation) which may then be transformed into a zero click deployment (e.g., no deployment resource, automated script, automated execution, automated validation).

Figure 5:
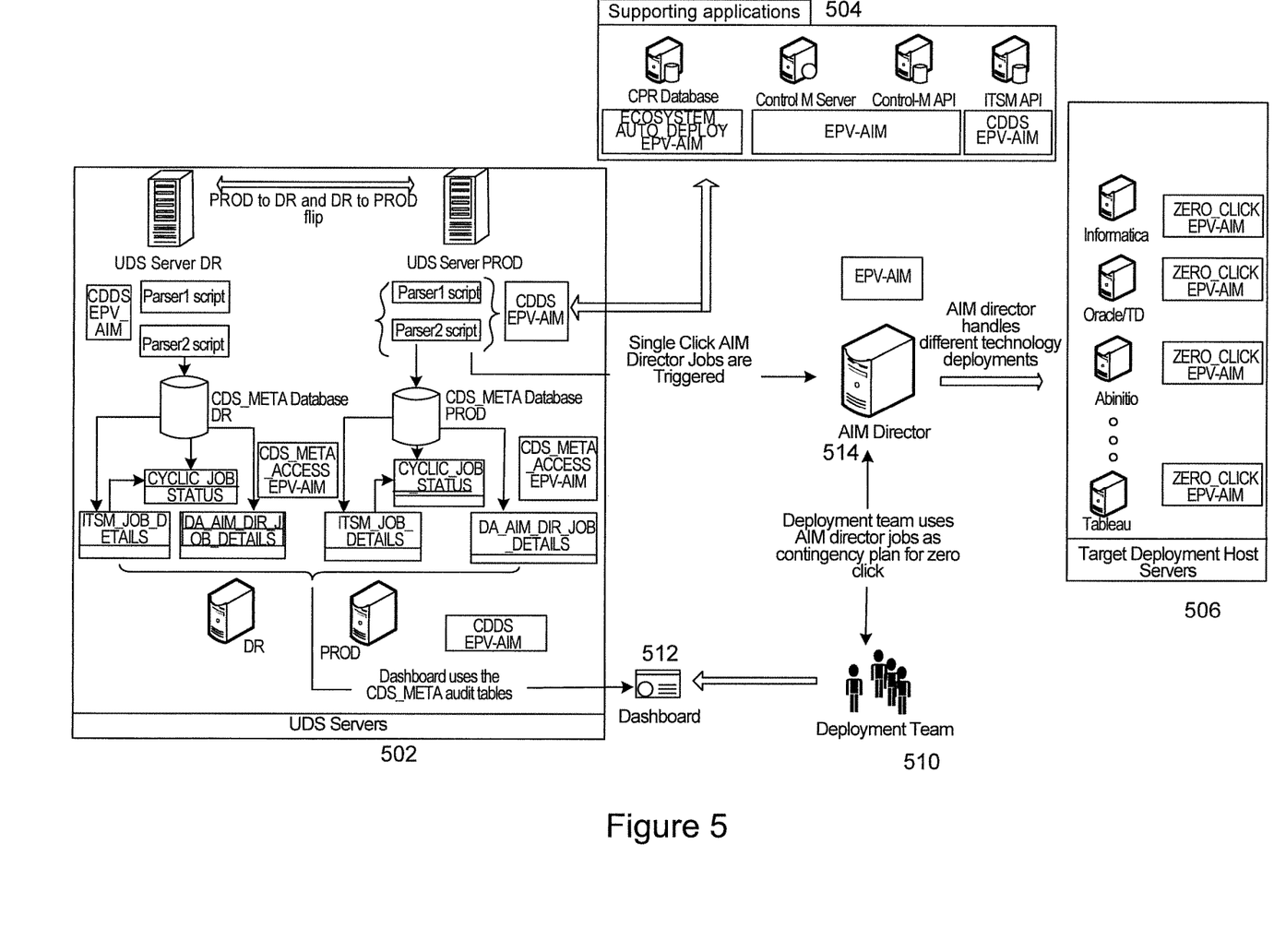
FIG. 5 is an exemplary system diagram of a zero click architecture, according to an embodiment of the present invention.

FIG. 5 is an exemplary system diagram of a zero click architecture, according to an embodiment of the present invention. FIG. 5 illustrates Servers 502, Supporting Applications 504 and Target Deployment Host Servers 506. Deployment Team 510 may access Dashboard 512 where audit tables may be received. Deployment Team 510 may use AIM Director jobs as a contingency plan for zero click functionality. As shown in FIG. 5, single click AIM Director Jobs may be triggered. AIM Director 514 may further provide various technology deployments, as represented by 506.

Figure 6:
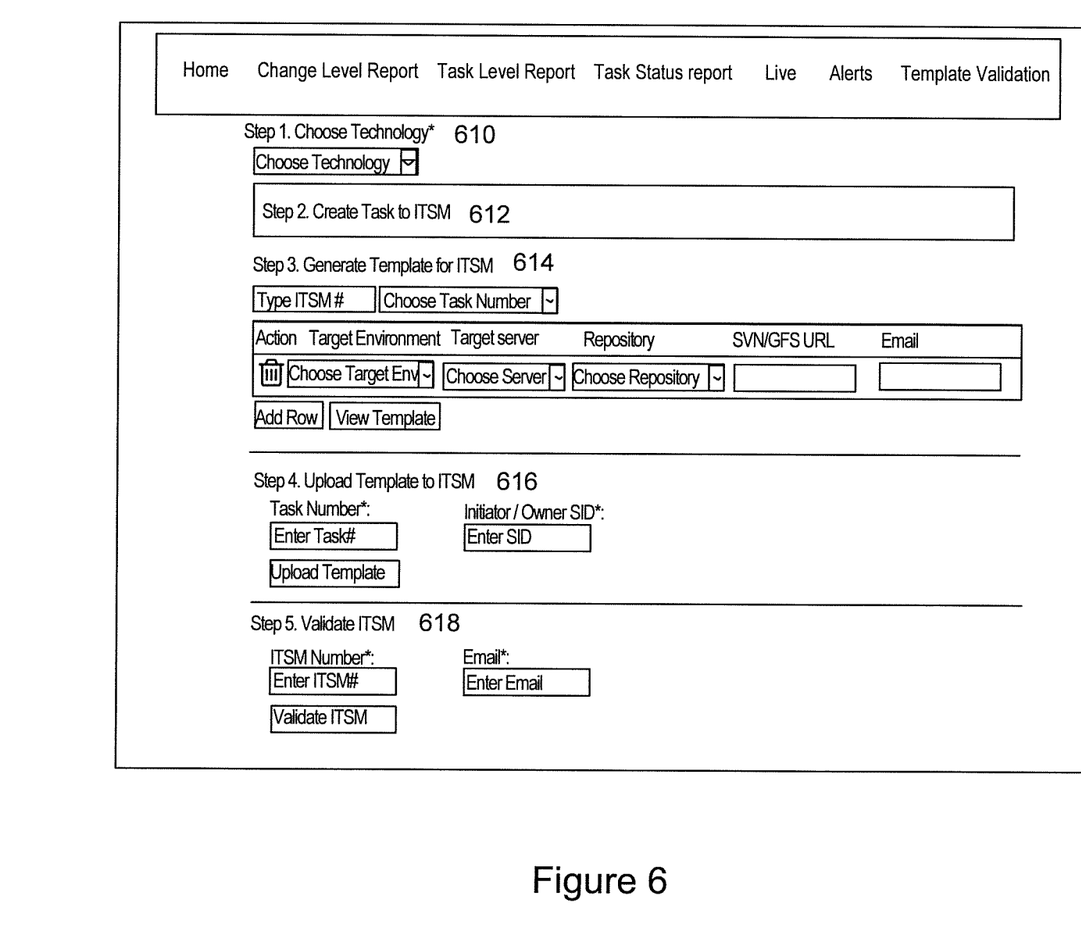
FIG. 6 is an exemplary interface for a zero click architecture implementation, according to an embodiment of the present invention.

FIG. 6 is an exemplary interface for a zero click architecture implementation, according to an embodiment of the present invention. As shown at 610, a technology may be selected. As shown by 612, a task may be created to ITSM. As shown by 614, a template may be generated. Various features may be identified, including action, target environment, target server, repository, URL, email, etc. As shown by 616, the template may be uploaded. A task number and owner may be identified. As shown by 618, a validation process may be initiated. An identifier and email (or other address) may be identified. Other features and functionality may be supported in accordance with the various embodiments of the present invention.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable faun such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that integrates an automated deployment system with a change management tool and process, the system comprising:
   an input that receives an instruction signal;
   a memory component; and
   a computer server coupled to the input and the memory component, the computer server comprising a programmed computer processor configured to:
   identify, at a change management tool, a software build for deployment from an application development (AD) team, wherein the change management tool integrates an Application Infrastructure Model (AIM), an IT Service Management (ITSM), a Global File System (GFS) and a Code Repository;
   create, at the change management tool, a software versioning and revision control system link, defining and submitting an implementation plan for deployment;
   automatically generate and retrieve a password from an Enterprise Password Vault (EPV);
   identify one or more deployment parameters based on the implementation plan;
   execute, via the automated deployment system, a deployment script based on the one or more deployment parameters; wherein the automated deployment system executes scripts for making data structure changes via Data Definition Language (DDL);
   transmit, via an electronic communication, log files of the deployment script to the AD team; and
   validate the electronic communication and the log files.

2. The system of claim 1, wherein the automated deployment system executes and deploys to one or more big data environments.

3. The system of claim 1, wherein the automated deployment system executes scripts for making data changes via Data Manipulation Language (DML).

4. The system of claim 1, wherein the automated deployment system executes extract, transform, load (ETLs) scripts.

5. The system of claim 1, wherein the implementation plan comprises a series of steps that specify a deployment process.

6. The system of claim 5, wherein the series of steps comprise a database structural change.

7. The system of claim 5, wherein the series of steps comprise extracting code from a specific code repository.

8. A method that integrates an automated deployment system with a change management tool and process, the method comprising the steps of:
   identifying, at a change management tool, a software build for deployment from an application development (AD) team, wherein the change management tool integrates an Application Infrastructure Model (AIM), an IT Service Management (ITSM), a Global File System (GFS) and a Code Repository;
   creating, at the change management tool, a software versioning and revision control system link, defining and submitting an implementation plan for deployment;
   automatically generating and retrieving a password from an Enterprise Password Vault (EPV);
   identifying one or more deployment parameters based on the implementation plan;
   executing, via the automated deployment system, a deployment script based on the one or more deployment parameters; wherein the automated deployment system executes scripts for making data structure changes via Data Definition Language (DDL);
   transmitting, via an electronic communication, log files of the deployment script to the AD team; and
   validating the electronic communication and the log files.

9. The method of claim 8, wherein the automated deployment system executes and deploys to one or more big data environments.

10. The method of claim 8, wherein the automated deployment system executes scripts for making data changes via Data Manipulation Language (DML).

11. The method of claim 8, wherein the automated deployment system executes extract, transform, load (ETLs) scripts.

12. The method of claim 8, wherein the implementation plan comprises a series of steps that specify a deployment process.

13. The method of claim 12, wherein the series of steps comprise a database structural change.

14. The method of claim 12, wherein the series of steps comprise extracting code from a specific code repository.

* * * * *